(12) United States Patent
O'Mahony et al.

(10) Patent No.: US 10,042,441 B2
(45) Date of Patent: Aug. 7, 2018

(54) CONFIGURABLE AMBIDEXTROUS INPUT DEVICE

(71) Applicant: Logitech Europe S.A., Lausanne (CH)

(72) Inventors: Davin O'Mahony, Midleton County Cork (IE); Kevin Forde, Cork (IE); Niall White, Morges (CH); Frederic Fortin, Annemasse (FR); Christian Castellaro, Monthey (CH); Fabrice Sauterel, Lausanne (CH); Christopher Pate, San Lorenzo, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 15/217,737

(22) Filed: Jul. 22, 2016

(65) Prior Publication Data

US 2017/0220132 A1 Aug. 3, 2017

Related U.S. Application Data

(60) Provisional application No. 62/289,905, filed on Feb. 1, 2016.

(51) Int. Cl.
*G06F 3/033* (2013.01)
*G09G 5/08* (2006.01)
(Continued)

(52) U.S. Cl.
CPC .......... *G06F 3/038* (2013.01); *G06F 3/03543* (2013.01); *G06F 2203/0332* (2013.01)

(58) Field of Classification Search
CPC ................ G06F 3/038; G06F 3/03543; G06F 2203/0332
See application file for complete search history.

(56) References Cited

U.S. PATENT DOCUMENTS 5,977,952 A * 11/1999 Francis ............... G06F 3/03543
345/156
6,072,471 A * 6/2000 Lo ....................... G06F 3/03543
341/20
(Continued)

OTHER PUBLICATIONS

GGF Events, "#0109—ROCCAT Nyth unboxing and first look" site URL: "https://www.youtube.com/watch?v=fWSm1j27Xx4", pulled from internet Aug. 3, 2016. Published Aug. 5, 2015. 6 minute mark is relevant.
(Continued)

*Primary Examiner* — Erin M File
(74) *Attorney, Agent, or Firm* — Kilpatrick, Townsend & Stockton, LLP (57) ABSTRACT

In certain embodiments, an input device includes a chassis and a depressible actuator disposed on the chassis that, when depressed, generates and sends a control signal to a processor, where the actuator is coupleable to a removable button cover that provides user-access to activate the actuator, and a removable blank cover to prevent user access to activate the actuator. The button cover and blank cover can be separate from the chassis and may directly attach to the actuator. The input device can further include a second depressible actuator disposed on the chassis that, when depressed, generates and sends a second control signal to the processor, where the second actuator is coupleable to the button cover and the blank cover.

5 Claims, 9 Drawing Sheets

(51) Int. Cl.
*G06F 3/038* (2013.01)
*G06F 3/0354* (2013.01)

(56) References Cited

U.S. PATENT DOCUMENTS

| | | | | |
|---|---|---|---|---|
| 6,362,811 | B1* | 3/2002 | Edwards | G06F 3/03543 248/118.1 |
| 6,567,073 | B1* | 5/2003 | Levin | G06F 3/03543 345/156 |
| 2006/0274042 | A1* | 12/2006 | Krah | G06F 3/03543 345/163 |
| 2007/0152966 | A1* | 7/2007 | Krah | G06F 3/016 345/163 |
| 2008/0165136 | A1* | 7/2008 | Christie | G06F 3/0482 345/173 |
| 2008/0220752 | A1* | 9/2008 | Forstall | H04M 1/56 455/415 |
| 2008/0297476 | A1* | 12/2008 | Hotelling | G06F 21/32 345/163 |
| 2010/0302144 | A1* | 12/2010 | Burtner | G06F 3/0416 345/157 |
| 2012/0146909 | A1* | 6/2012 | Bowden | G06F 3/03543 345/163 |
| 2015/0070278 | A1* | 3/2015 | Rehn | G06F 3/03543 345/163 |
| 2016/0342258 | A1* | 11/2016 | Han | G06F 3/033 |
| 2017/0112249 | A1* | 4/2017 | Peterson | A45C 13/002 |
| 2017/0223176 | A1* | 8/2017 | Anzures | H04M 1/72583 715/835 |

OTHER PUBLICATIONS

ROCCAT, "Surprise announced the new gamers mouse unpublished "Kiro", "Kova" in Akihabara event site URL: 'https://translate.google.com/translate?hl=en&ie=UTF8&prev=_t&sl=ja&tl=en&u=http://www.4gamer.net/games/102/G010229/20151005084/", pulled from internet Aug. 3, 2016. Published Oct. 6, 2015. Refer to the Kiro product.

* cited by examiner

CONFIGURABLE AMBIDEXTROUS INPUT DEVICE

This application is a non-provisional application and claims the benefit and priority of U.S. Provisional Application No. 62/289,905, filed on Feb. 1, 2016, and titled "Configurable Ambidextrous Input Device," which is hereby incorporated by reference in its entirety for all purposes.

BACKGROUND

Input devices are ubiquitous in modern culture and are typically used to convert analog inputs (e.g., touches, clicks, motions, gestures, button presses, etc.) into digital signals for computer processing. An input device can include any device used to provide data and control signals to an information processing system such as a computer. Some non-limiting examples of input devices include computer mice, remote controls, gaming controllers, joysticks, trackballs, and the like.

Input devices, such as computer mice, are conventionally designed for a particular configuration. For example, an input device can be designed for a left or right handed user. To facilitate different configurations, many manufacturers settle for either providing multiple mice, i.e., a left-handed mouse and a right-handed mouse, or sacrificing performance of a mouse by including multiple configurations in one mouse at the same time. These solutions typically prove costly, uncomfortable, and/or less functional. Therefore, there is a need for a better solution to adapt to a left-handed and right-handed configuration.

BRIEF SUMMARY

In certain embodiments, an input device includes a chassis and a depressible actuator disposed on the chassis that, when depressed, generates and sends a control signal to a processor, where the actuator is coupleable to a removable button cover that provides user-access to activate the actuator, and a removable blank cover to prevent user access to activate the actuator. The button cover and blank cover can be separate from the chassis. The button cover can directly attach to the actuator, and the blank cover can directly attach to the actuator. The input device can further include a second depressible actuator disposed on the chassis that, when depressed, generates and sends a second control signal to the processor, wherein the second actuator is coupleable to the button cover and the blank cover, where the chassis can have a first side and a second side, where the actuator can be disposed on the first side of the chassis, and where the second actuator can be disposed on the second side of the chassis.

In some cases, the input device is symmetrical along a line on the chassis that bisects the first and second actuators. The first actuator and second actuator can be coupleable to second blank cover that covers both the first and second actuators. In some embodiments, the input device can further include an outer housing coupled to the chassis, where the outer housing has an outer contour, and where the blank cover includes a surface that continues the contour of the outer housing when the blank cover is coupled to the actuator. The input device can be a computer mouse and the button cover and the blank cover may couple to the actuator via magnetic coupling (among other methods as further discussed below).

In some embodiments, a computer mouse includes a chassis, a processor disposed in the chassis, a housing coupled to the chassis to receive a user's hand, and an actuator disposed on the chassis and separated from the housing. In some cases, the actuator can be depressible to cause the processor to electrically switch the computer mouse between a first operating state and a second operating state. The actuator can coupleable to either one of a removable button cover and a removable blank cover, where the button cover and blank cover, when coupled to the actuator, may be separated from the chassis and housing. In some implementations, the button cover, when coupled to the actuator, allows the user to depress the actuator, and the blank cover, when coupled to the actuator, prevents the user from depressing the actuator.

The computer mouse can further include a second actuator disposed on the chassis and separate from the housing, where the second actuator is coupleable to either one of the button cover and the blank cover, where the button cover allows the user to depress the second actuator when coupled thereto, and where the blank cover prevents the user from depressing the second actuator when coupled thereto. The blank cover may couple to both the first and second actuators and prevent the user from depressing both the first and second actuators. The housing may have a surface contour and the blank cover may have a surface contour, where the surface contour of the blank cover can match the surface contour of the housing when coupled to the actuator. In some embodiments, the button cover and the blank cover may couple to the actuator via magnetic coupling. The processor can be disposed in the computer mouse, or the processor can be external to the computer mouse.

In certain embodiments, a method of operating a computer mouse (performed by one or more processors) includes detecting a cover coupled to an actuator disposed in the computer mouse, where the actuator, when depressed, generates a first control signal to control a remote computing device. The method can further include determining that the cover is of a first type or a second type and generating a second control signal corresponding to the cover being of the first type or second type. The method may further include configuring the computer mouse in a first operational configuration in response to determining that the cover is of the first type, and configuring the computer mouse in a second operational configuration in response to determining that the cover is of the second type.

In some embodiments, the first operational configuration can include configuring the mouse in a right-handed configuration, and the second operational configuration can include configuring the computer mouse in a left-handed configuration. In some implementations, the computer mouse can include a first mouse button and a second mouse button, where when in the right-handed configuration: the first mouse button, when pressed, generates a third control signal that corresponds to a left-button mouse click, and the second mouse button, when pressed, generates a fourth control signal corresponding to a right-button mouse click. In some cases, when in the left-handed configuration: the first mouse button, when pressed, generates the third control signal that corresponds to a right-button mouse click, and the second mouse button, when pressed, generates the fourth control signal that corresponds to a left-button mouse click.

In further embodiments, a method of operating a computer mouse includes receiving, by a host computer coupled to the computer mouse, a first control signal indicating that a cover is coupled to an actuator disposed in the computer mouse, determining, by the host computer, whether the cover is of a first type or a second type, generating, by the host computer, a second control signal to cause the computer mouse to operate in a first operational configuration in response to determining that the cover is of the first type, and generating, by the host computer, a third control signal to cause the computer mouse to operate in a second operational configuration in response to determining that the cover is of the second type.

DETAILED DESCRIPTION

Embodiments of this disclosure are generally directed to input devices. More specifically, certain embodiments of the invention relate to systems and devices for providing a configurable, ambidextrous input device.

In the following description, numerous examples and details are set forth in order to provide an understanding of embodiments of the present disclosure. It will be evident, however, to one skilled in the art that certain embodiments can be practiced without some of these details, or can be practiced with modifications or equivalents thereof.

Overview of Certain Exemplary Embodiments

In certain embodiments, an input device (e.g., computer mouse) includes a chassis and one or more depressible actuators (e.g., side buttons) disposed on the chassis that, when depressed, can generate a control signal that may be sent to a processor (e.g., internal or external to the chassis) for further processing. Different types of removable covers can be coupled (e.g., attached) to the actuators to allow a user to customize physical and electrical characteristics of the input device to their individual preference. For example, a button cover (i.e., a first type) can be coupled to an actuator to provide user access to the actuator (e.g., allowing a user to depress and activate the actuator). A blank cover (i.e., a second type) can be coupled to an actuator to prevent user access to the actuator (e.g., blocking a user from depressing and activating the actuator). Thus, a user can configure a multi-actuator input device in a wide variety of configurations by using different combinations of covers. For example, some users may use button covers on actuators on a left side of a mouse and blank covers on actuators on a right side of a mouse to accommodate a right-handed configuration. Similarly, some users may use button covers on actuators on the right side of the mouse and blank covers on actuators on the left side of the mouse to accommodate a left-handed configuration.

In some embodiments, a button cover and/or blank cover couples to the actuator and do not contact or couple to the chassis, housing, removable portions of the chassis or housing, or other structures. The input device can be symmetrical. For instance, the input device can be symmetrical along a line on the chassis (or housing) that bisects a first set of actuators (e.g., on a left side of the chassis) and a second set of actuators (e.g., on a right side of the chassis), such as line 505 of FIG. 5B. In some cases, the housing of the input device may have a particular surface contour. The button cover, when coupled to the actuator, may protrude beyond a surface plane formed by the surface contour of the housing to provide a marker (e.g., tactile feedback) for a user to quickly and easily access the actuator. The blank cover, when coupled to the actuator, may include a surface contour that matches the surface contour of the housing to provide a continuous contour from the cover to the housing. In some embodiments, the covers can be mechanically (e.g., screw, pin, tab, etc.) or magnetically coupled to the actuators. The actuator(s) can generate a control signal that is sent to a processor that may be disposed in the input device (e.g., in a computer mouse) or may be external to the input device (e.g., host computer device).

Figure 10:
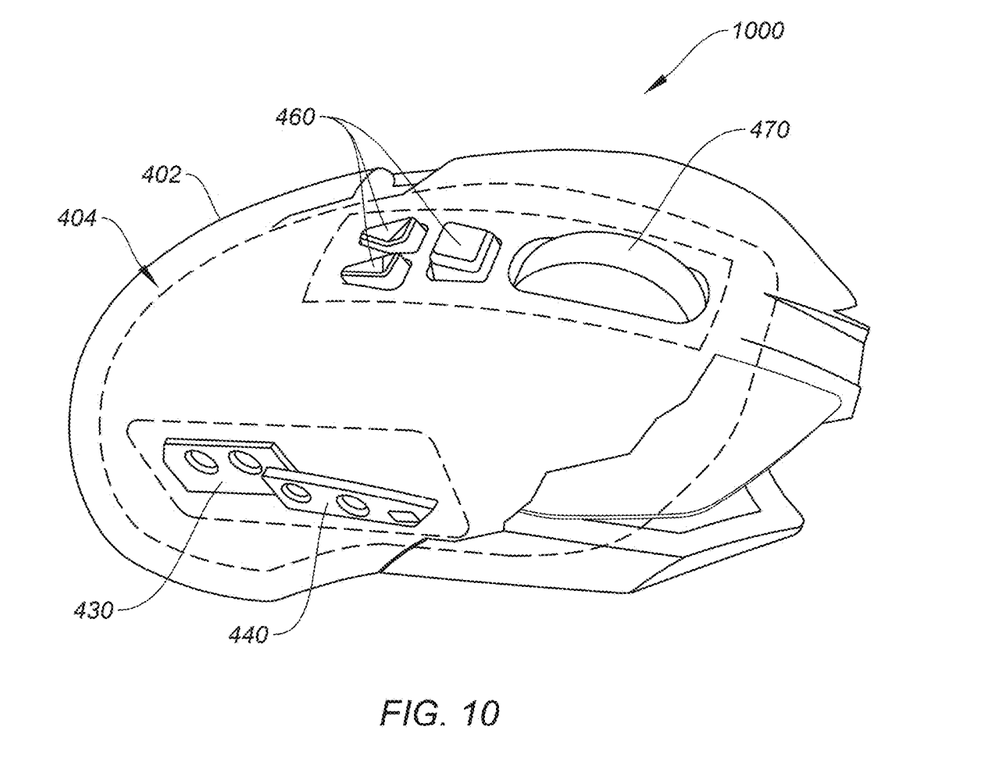
FIG. 10 shows a simplified block diagram of an input device having a chassis, housing, and corresponding actuators, according to certain embodiments.

In certain embodiments, the internal structure or base frame of the input device can be referred to as the "chassis." An outer covering or shell that typically forms the shape of the input device (i.e., the visible portion that a user can interface with) can be referred to as the "housing" or "outer housing." For example, in FIG. 10 (based on FIG. 4), input device 1000 includes chassis 404 and housing 402. Actuators 430 and 440 are coupled to chassis 404. In some implementations, actuators 430 and 440 may be separate from housing 402. In some cases, covers (not shown) may couple directly to the actuators and may or may not contact or brace against housing 402.

System Environment

Figure 1:
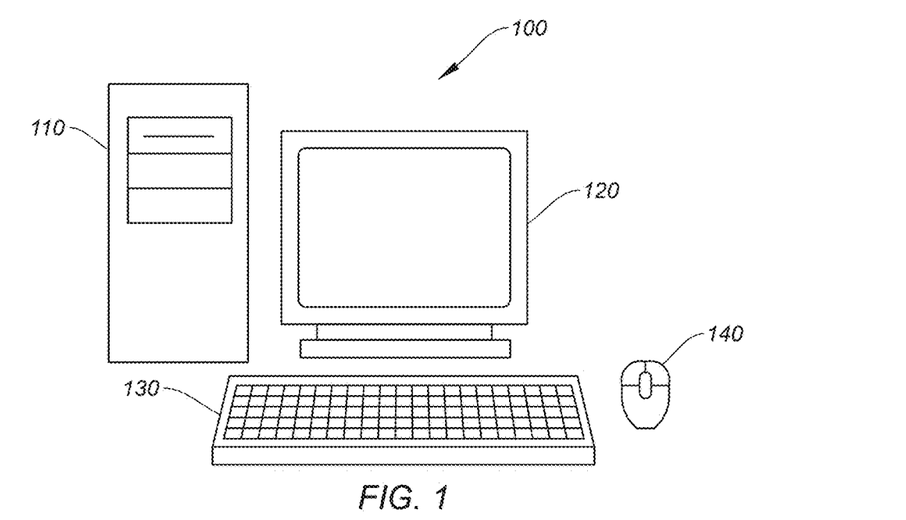
FIG. 1 shows a simplified schematic diagram of a computer system, according to certain embodiments.

FIG. 1 is a simplified schematic diagram of computer system 100, according to certain embodiments. Computer system 100 may include computer 110, monitor 120, keyboard 130, and input device 140. In some embodiments, input device 140 can be a computer mouse, a remote control device, a game controller, a trackball, a track pad, a touch sensitive device (e.g., tablet computer, personal digital assistant, media player, etc.), a mobile device, or any other suitable device that can convert analog input signals into digital signals for computer processing. For computer system 100, input device 140 and keyboard 130 can be configured to control aspects of computer 110 and monitor 120.

In some embodiments, input device 140 can provide control signals for selection (e.g., button presses), movement tracking (e.g., x-y movement on a planar surface, z-movement for lift detection, etc.), touch/gesture detection, orientation detection, power management controls, and the like, as would be appreciated by one of ordinary skill in the art.

Computer 110 may include a machine readable medium (not shown) that is configured to store computer code, such as mouse driver software, and the like, where the computer code is executable by a processor (e.g., processor(s) 210) of computer 110 to affect control of computer 110 by input device 140. The various embodiments described herein generally refer to input device 140 as a computer mouse or similar input device, however it should be understood that input device 140 can be any input/output (I/O) device, user interface device, control device, input unit, or the like.

Figure 2:
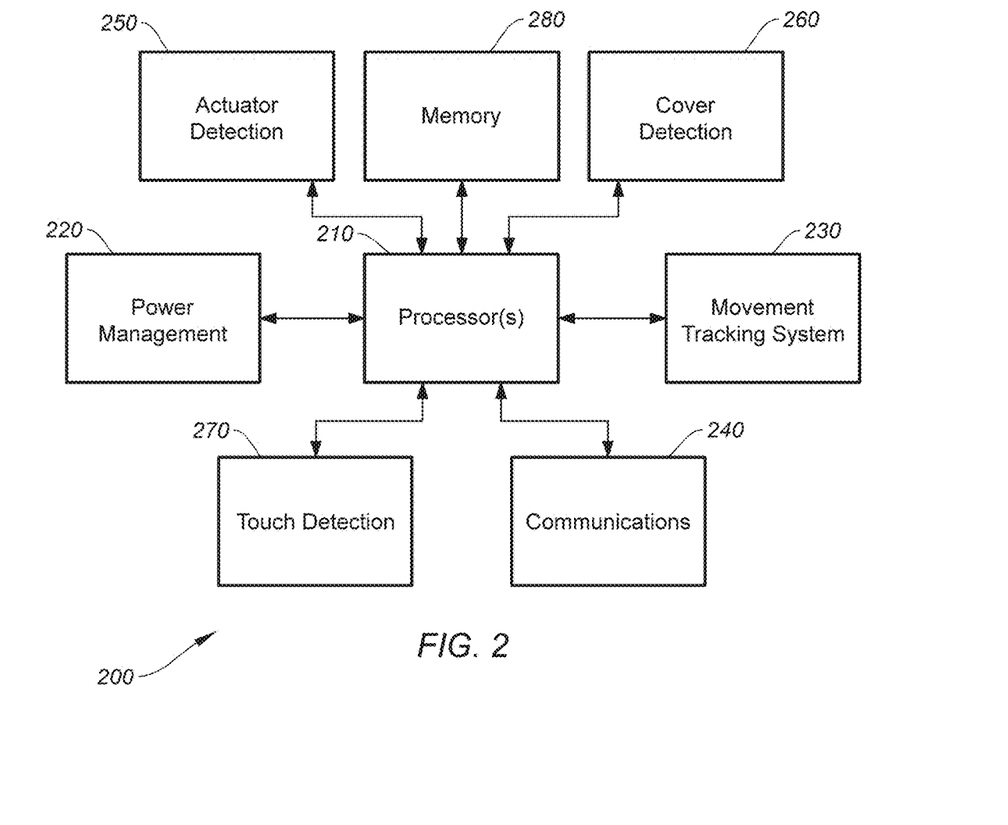
FIG. 2 shows a simplified block diagram of a system configured to operate an input device, according to certain embodiments.

FIG. 2 shows a simplified block diagram of system 200 to operate input device 140, according to certain embodiments. System 200 can include processor(s) 210, power management block 220, movement tracking block 230, communications block 240, actuator detection block 250, cover detection block 260, touch detection block 270, and storage device(s) 280. Each block 220-280 can be in electrical communication with processor(s) 210. Other electrical communications can be present in input device 140. Additional systems that can be included in system 200 are not shown or discussed in order to prevent obfuscation of the novel features described herein.

In certain embodiments, processor(s) 210 can include one or more processors or microprocessors (μCs) to control the operation of system 200. Alternatively, processor(s) 210 can include one or more microcontrollers (MCUs), digital signal processors (DSPs), or the like, with supporting hardware and/or firmware (e.g., memory, programmable I/Os, etc.), as would be appreciated by one of ordinary skill in the art. Alternatively, MCUs, μCs, DSPs, and the like, can be configured in other blocks of system 200. In some embodiments, multiple processors can provide an increased performance in system 200 speed and bandwidth. Although multiple processors may improve system 200 performance, they are not required for standard operation of the embodiments described herein.

Power management system block 220 can be configured to manage power distribution, recharging, power efficiency, and the like, for input device 140, according to certain embodiments. In some embodiments, power management system block 220 can include a battery (not shown), a USB based recharging system for the battery (not shown), power management devices (e.g., low-dropout voltage regulators—not shown), and a power grid within system 200 to provide power to each subsystem (e.g., an accelerometer, a gyroscope, etc.—not shown). In certain embodiments, certain functions provided by power management system block 220 can be incorporated into processor(s) 210 or subsumed in other system blocks.

Movement tracking system block 230 can be configured to track the movement of input device 140, according to certain embodiments. In certain embodiments, movement tracking system block 230 can use optical sensors such as light-emitting diodes (LEDs) or an imaging array of photodiodes to detect a movement of input device 140 relative to an underlying surface. Input device 140 can include movement tracking hardware that utilizes coherent (laser) light. In certain embodiments, one or more optical sensors can be disposed on the bottom side of input device 140. Movement tracking system block 230 can provide positional data (e.g., X-Y coordinate data) or lift detection data. For example, an optical sensor can be used to determine when a user lifts input device 140 off of a surface and send that data to processor(s) 210 for further processing.

In certain embodiments, accelerometers can be used for movement detection. Accelerometers can be electromechanical devices (e.g., micro-electromechanical systems (MEMS) devices) configured to measure acceleration forces (e.g., static and dynamic forces). Accelerometers can further determine if input device 140 has been lifted off of a surface and provide movement data that can include the velocity, physical orientation, and acceleration of input device 140. In some embodiments, gyroscope(s) can be used in lieu of or in conjunction with accelerometer(s) to determine movement or input device orientation.

Communications block 240 can be configured to provide wireless communication from input device 140 to computer 110, or other devices and/or peripherals, according to certain embodiments. Communications block 240 can be configured to provide radio-frequency (RF), Bluetooth, Bluetooth Low Energy (BTLE), infra-red (IR), ZigBee, or other suitable communication protocol to communicate with other wireless devices. System 200 can include a hardwired connection to a host computer (e.g., computer 110). For example, input device 140 can be configured to receive a Universal Serial Bus (USB) cable to enable bi-directional electronic communication with a host computer or other external devices. Some embodiments may utilize different types of cables or connection protocol standards to establish hardwired communication with other entities. Some embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

Storage device(s) 280 (i.e., Memory 280) can include memory subsystems and file/disk storage subsystems, which can be non-transitory computer-readable storage media that can store program code and/or data that provide the functionality of embodiments of the present disclosure (e.g., method 900). In some embodiments, storage device 280 can include a number of memories including main random access memory (RAM) for storage of instructions and data during program execution and read-only memory (ROM) in which fixed instructions may be stored. Storage device 280 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or any other type of storage media known in the art.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic storage devices or any other medium which can be used to store and later accessed by system 200.

Actuator detection block 250 can be configured to detect an activation of one or more actuators on input device 140. In some embodiments, an actuator can be activated when depressed by a user. Actuators can be mechanical (e.g., depressible using a spring to close/open a switch), capacitance-based (e.g., touch sensitive), or resistance-based technologies. When activated, an actuator can provide a control signal (e.g., to actuator detection block 250, processor(s) 210, etc.) to indicate that the actuator has been activated. Control signals can be binary (e.g., activation or no activation) or may include multiple activation states (e.g., three or more activation/non-activation/intermediate states), as would be understood by one of ordinary skill in the art. Actuators can be located on any portion of an input device. For example, one or more actuators can be disposed on the sides of an input device (e.g., for thumb or pinky activation), on the front or top of an input device (e.g., for first and second finger access), or other suitable location.

In certain embodiments, actuators can be coupled to a chassis and may be separate from a housing. A chassis, for example, may be a rigid internal structure for an input device for supporting and/or securing a printed circuit board (PCB) and corresponding electronics (e.g., aspects of system 200), various controlling hardware (e.g., scroll wheel, buttons, sliders, etc.) and the like (e.g., see chassis 404 of FIG. 10). A housing, for example, can be coupled to a chassis and may be an outer shell of an input device (see, e.g., housing 402 of FIG. 10). In some embodiments, a housing can be a portion of an input device that a user holds, manipulates, or controls, etc. Actuators can be independent from a housing such that the actuator can freely move (e.g., can be depressed) relative to the housing. Actuator detection block 250 can be an independent system block or may be integrated with (wholly or partially) one or more other system blocks of system 200 (e.g., processor(s) 210).

Figure 5A:
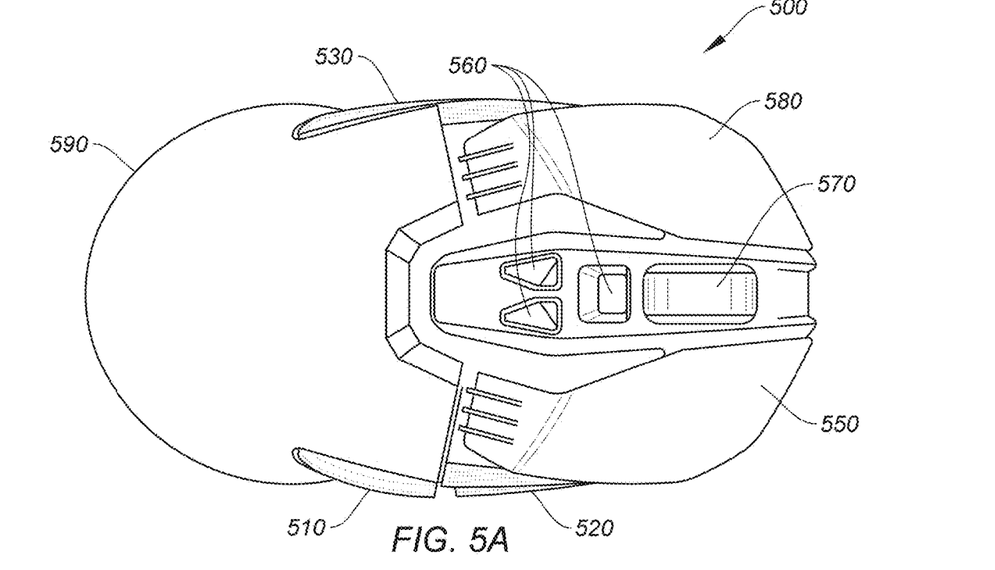
FIG. 5A shows a simplified diagram of an input device, according to certain embodiments.

In some embodiments, cover detection block 260 can detect a cover coupled to one or more actuators on input device 140. In some cases, cover detection block 260 can detect a type of cover coupled to the one or more actuators on input device 140. One type of cover can be a removable button cover that provides user access to activate an actuator (e.g., depress the actuator). For instance, the button cover may attach to an actuator and protrude from a surface contour formed by the housing for easy user access. A second type of cover can be a removable blank cover that prevents user access to activate a corresponding actuator. That is, a blank cover may simply block a user from touching and/or accessing an actuator. In some embodiments, a blank cover may have a surface contour that, when coupled to an actuator, matches a surface contour of a corresponding housing to maintain a continuous surface contour between the cover and housing. One non-limiting example of a button cover (510) and blank cover (530) is shown in FIG. 5. In some implementations, the blank cover and/or the button cover are separate from the chassis or housing, such that when they are coupled to an actuator, they only contact the actuator and no other portion of the corresponding input device.

In certain embodiments, cover detection block 260 can detect when a cover is coupled to an actuator in a number of different ways. For example, a cover may include a plunger or protrusion that couples to a hole in the actuator that activates a switch, or a cover or actuator may include a magnet that causes a relay to close. Some covers and/or actuators may be keyed such that the covers can only be coupled in a certain orientation. In some cases, covers and/or actuators can be keyed or may include switches, sensors, etc., that can provide a means (e.g., electronics) to allow cover detection block 260 (and/or processor(s) 210) to differentiate between a button cover and a blank cover.

In some embodiments, a mechanical switch can be used to detect when a cover is coupled to an actuator. Some mechanical switches include a detect switch or a low-force push/tact switch. A detect switch can include a low-force switch that prevents a circuit from closing. A magnetic attraction force in a cover (e.g., a magnet) can overcome the low force and cause a circuit to close (e.g., to generate a control signal indicating that a cover is coupled to the actuator). A low force push/tact switch can work in a similar fashion, as would be understood by one of ordinary skill in the art.

In some embodiments, an electrical switch can be used to detect when a cover is coupled to an actuator. For example, a cover can have an electrical component that provides a unique code for the particular cover (e.g., blank covers are associated with a first code, and button covers are associated with a second code) that can be detected by a processor to determine a type of cover. In some implementations, the input device (e.g., an actuator) can include a set of electrical contacts that connect with an opposing contact on the cover when the cover is attached, and a processor (e.g., processor(s) 210) can then recognize which cover is attached based on the unique code.

In further embodiments, the second type of mechanism to detect when a cover is coupled to an actuator can include an analog-to-digital converter (ADC). The input voltage of an ADC can be changed by using a voltage divider. In some cases, the voltage divider may be in a cover, in the corresponding actuator, or a combination thereof. One of ordinary skill in the art would understand the implementation of an ADC to detect whether a cover is coupled to an actuator.

In some embodiments, a third type of mechanism that can be used to detect when a cover is coupled to an actuator can include sensing using a force-sensitive resistor (FSR), using radio frequency (RF), or electromagnetic induction. For instance, FSRs can sense pressure in the cover or input device to detect left- or right-handed use. RF-based systems can be used to communicate from the cover to the input device (e.g., processor(s) 210 or communication block 240) to indicate that the cover is coupled to an actuator, indicate a type of cover, or the like.

In certain embodiments, a cover and a corresponding actuator can each include an inductive coil that, when brought together (e.g., when the cover is coupled to the actuator), change a value for a measured mutual inductance that can be used to determine if a cover is coupled to the corresponding actuator. Any suitable type, size, or configuration of coils, materials, and supporting circuitry can be utilized, as would be understood by one of ordinary skill in the art.

In some embodiments, a cover can be detected through capacitive sensing. For example, a cover and corresponding actuator may each exhibit a certain capacitance that may change when coupled together. Any suitable capacitive parameters can be used including any plate material, dielectric, dimensions (e.g., plate spacing), supporting circuitry, and the like. Any suitable means of detection (e.g., Hall sensor, optical sensors, optical switches, etc.) can be used as would be understood by one of ordinary skill in the art.

In some embodiments, touch detection block 270 can detect touch or touch gestures on one or more touch-sensitive surfaces of input device 140, such that one-dimensional (1D) or two-dimensional (2D) touch detection (e.g., x-axis and y-axis movement) is possible. For example, a surface on a housing of input device 140 may include one or more touch sensitive surfaces.

Various technologies can be used for touch and/or proximity sensing. Examples of such technologies include, but are not limited to, resistive (e.g., standard air-gap 4-wire based, based on carbon loaded plastics which have different electrical characteristics depending on the pressure (FSR), interpolated FSR, etc.), capacitive (e.g., surface capacitance, self-capacitance, mutual capacitance, etc.), optical (e.g., infrared light barriers matrix, laser based diode coupled with photo-detectors that could measure the time of flight of the light path, etc.), and acoustic (e.g., piezo-buzzer coupled with some microphones to detect the modification of the wave propagation pattern related to touch points, etc.), etc.

System 200 can include other systems, though not expressly discussed, as would be understood by one of ordinary skill in the art. For example, system 200 can include a bus system to transfer power and/or data to and from the different systems therein. In some embodiments, system 200 can include a storage subsystem (not shown). A storage subsystem can store one or more software programs to be executed by processors (e.g., in processor(s) 210). The term "software" can refer to sequences of instructions that, when executed by processing unit(s) (e.g., processors, processing devices, etc.), cause system 200 to perform certain operations of software programs. The instructions can be also be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices (e.g., processor(s) 210) can retrieve program instructions to execute various operations (e.g., configuration detection, cover detection, etc.), as described herein.

It should be appreciated that system 200 is illustrative and that variations and modifications are possible. System 200 can have other capabilities not specifically described here. Further, while system 200 is described with reference to particular blocks, it is to be understood that these blocks are defined for convenience of description and are not intended to imply a particular physical arrangement of component parts. System blocks need not correspond to physically distinct components. In some implementations, system blocks may be configured to perform various operations, e.g., by programming a processor or providing appropriate control circuitry.

Embodiments of the present disclosure can be realized in a variety of apparatuses including electronic devices implemented using any combination of circuitry and software. Furthermore, aspects and/or portions of system 200 can be combined with or operated by other sub-systems as may be utilized. Moreover, it should be understood that the various embodiments of covers discussed herein can be of any size, shape, color, texture, etc., and can be applied to any input device (e.g., input device 140), with any suitable control infrastructure (e.g., system 200 including combinations and subsets thereof), at any preferred location and in any desired configuration. The foregoing embodiments are not intended to be limiting and those of ordinary skill in the art with the benefit of this disclosure would appreciate the myriad applications and possibilities. In addition, the term "chassis," as used herein, is to denote the outer structural framework of an input device.

Figure 3:
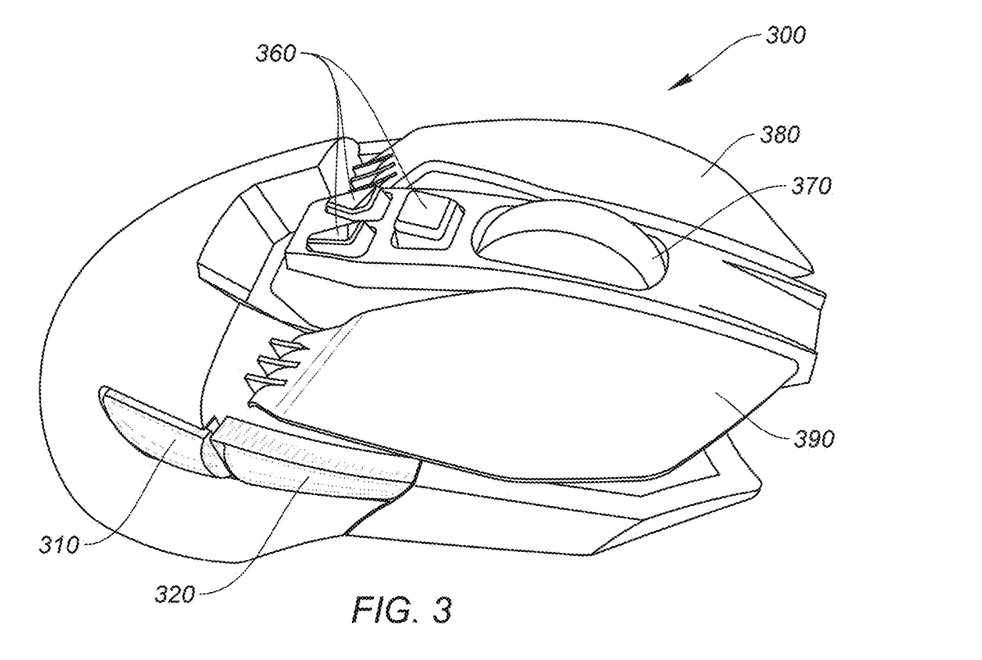
FIG. 3 shows a simplified diagram of an input device, according to certain embodiments.

FIG. 3 shows a simplified diagram of an input device 300, according to certain embodiments. Input device 300 includes first button cover 310 and second button cover 320. Button covers 310, 320 can be coupled to actuators (not shown) on a chassis of input device 300. The chassis and/or housing can be symmetrical (as shown) or configured specifically for left-hand or right-hand use. For instance, some input devices may have a thumb rest on a left side for right-handed users, or a thumb rest on the right side for left-handed users.

Input device 300 includes various buttons 360, scroll wheel 370, left button (e.g., first button) 380, and right button (e.g., second button) 390. Input device 300 can include fewer or more buttons, scroll wheels, slider, touch-sensitive regions, etc., as needed. Input device 300 can be hardwired to a host computer (e.g., computer 110) via universal serial bus (USB) or any suitable hard-wired connectivity protocol. In some embodiments, input device 300 can be wirelessly coupled to a host computer device using any suitable wireless communications protocol including, but not limited to, Bluetooth, Bluetooth LE, radio-frequency (RF), infra-red (IR), ZigBee, or the like.

In certain embodiments, both button covers 310, 320 can each be coupled to a separate actuator (not shown). Button covers allow can provide user access to activate (e.g., depress) the actuator, which may cause the actuator to generate and send a corresponding control signal to a processor(s) (210). In some embodiments, blank covers (see blank cover 530 of FIG. 5A) can be used. Blank covers can be coupled to an actuator and may prevent user access to activate the actuator. For instance, a blank cover may block or prevent the actuator from being depressed. In some embodiments, button covers and/or blank covers, when coupled to an actuator, may be separate from the chassis. In further embodiments, blank covers may be coupled to the actuator, but may use a portion(s) of the chassis for support and to prevent the corresponding actuator to be depressed. In some cases, the button and/or blank covers can be directly coupled or indirectly coupled to corresponding actuators. For example, intermediary features (e.g., spacers, trim, hardware, etc.) may be placed between a cover and a corresponding actuator. Furthermore, although two button covers are shown, any number of buttons and/or actuators can be used on any location of input device 300 (e.g., left side, right side, front side, back side, etc.) and in any configuration (e.g., symmetrical placement, asymmetrical placement, etc.).

In some embodiments, button covers and blank covers may have certain contours that provide several useful functions. For example, a button cover may protrude from a surface of a corresponding actuator on an input device so that a user may easily locate the button cover by touch without requiring visual confirmation. Furthermore, the protruding button cover can indicate to a user what type of cover is being used. For instance, a protruding cover can indicate that the underlying actuator can be pressed. A flat cover (e.g., blank cover) or a cover that continues a contour of the input device (e.g., no protrusion or depression from the surface of the input device) may indicate to the user that the actuator cannot be pressed. In other words, a surface contour of a blank cover can match the contour of the housing of corresponding input device such that the surface looks continuous with no protrusions or concavities.

In some implementations, covers may include alternative and/or additional features to indicate a type of actuator cover to a user. For example, some covers my include surface features (e.g., patterned micro-protrusions), different materials (e.g., cover is rubber and input device is plastic), haptic feedback, or the like.

Figure 4:
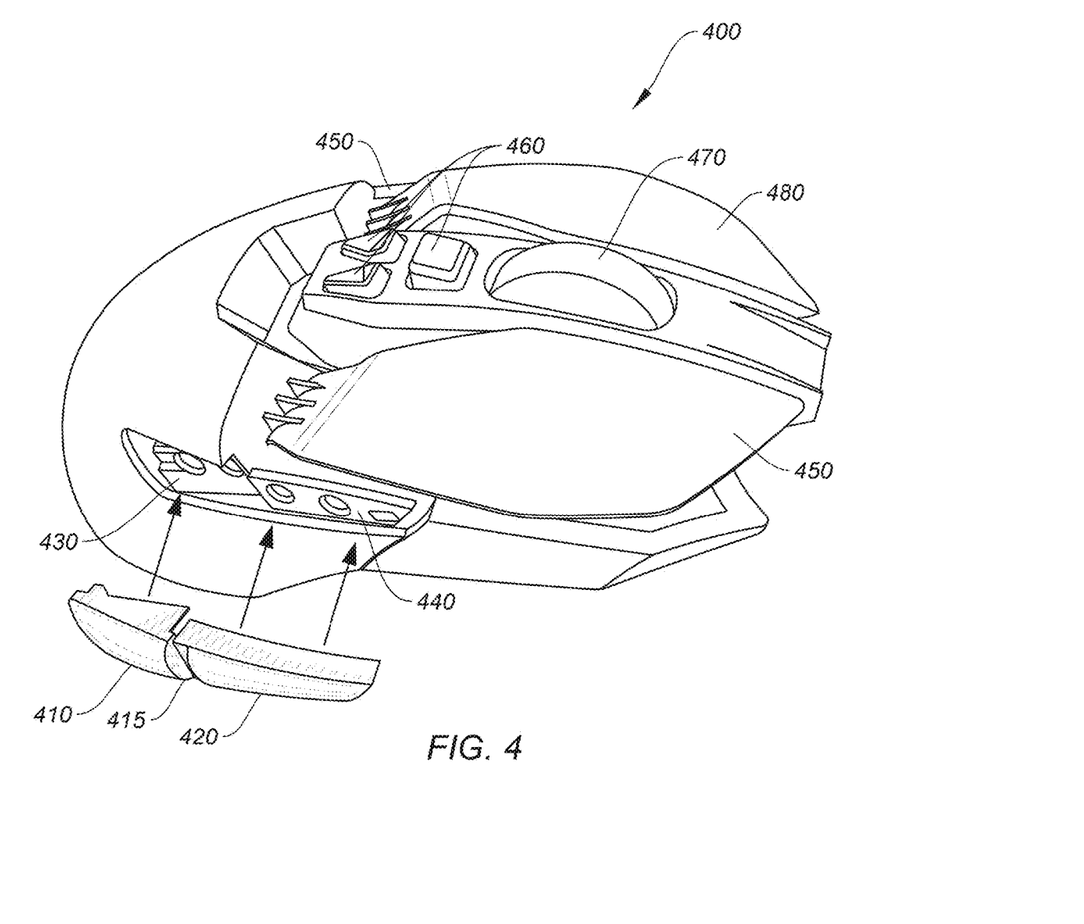
FIG. 4 shows a simplified diagram of an input device, according to certain embodiments.

FIG. 4 is a simplified diagram of an input device 400, according to certain embodiments. Input device 400 can include first button cover 410, second button cover 420, first actuator 430, second actuator 440, blank cover 450 (partially visible), miscellaneous buttons 460, scroll wheel 470, left button (e.g., first button) 480, and right button (e.g., second button) 490. Input device 400 can include fewer or more buttons, scroll wheels, slider, touch-sensitive regions, etc., as needed. For discussion purposes, input device 400 can be identical to input device 300, although other configurations and features are possible as would be understood by one of ordinary skill in the art. As shown in FIG. 4, first button cover 410 may be aligned with and coupled to first actuator 430. Similarly, second button cover 420 can be aligned with and coupled to second actuator 440. Blank cover 450 is coupled to an actuator (not shown) on the opposite side of input device 400. Button covers and blank covers may separately attach and/or detach from corresponding actuators via any suitable means (e.g., magnets), as further discussed below. Actuators 430, 440 can be depressible actuators, similar to a conventional button, as would be understood by one of ordinary skill in the art.

Button covers 410, 420 are shown with different shapes with respect to one another. For instance, button cover 410, as shown, may align and be coupleable with actuator 430, but may not be coupleable with actuator 440. Similarly, button cover 420 may align and be coupleable with actuator 440, not may not align with or be coupleable with actuator 430. However, button and/or blank covers and corresponding actuators may be of any size and/or shape. In some embodiments, actuators and button/blank covers may have uniform dimensions such that any button or blank cover may be interoperable with any actuator.

In certain embodiments, blank covers may block user access to an underlying actuator. In such cases, the actuator is not disabled and may still be depressible under the blank cover. In alternative embodiments, blank covers may couple to both the actuator in such a manner (e.g., via pins, tabs, or other hardware coupled to features in the actuator, housing, or chassis) that both covers the actuator and prevent the actuator from being depressible.

In some implementations, blank covers may be slightly depressible and may include a mechanical switch that releases the blank cover from an actuator to make it easier to remove. In such embodiments, the blank cover would not be depressible to an extent that would activate the underlying actuator. Certain embodiments may utilize a button or other means (e.g., mechanical switch) to cause a button cover or blank cover to decouple from an underlying actuator.

First actuator 430 and second actuator 440 can be coupled to the chassis of input device 400 for greater strength, durability, rigidity, and longevity, as compared to being coupled to flexible portions of the frame, the housing, a printed circuit board (PCB), or the like. Covers are typically individually removable and, in some embodiments, are interchangeable such that one cover (button cover or blank cover) can be placed on any actuator. Referring to FIG. 4, the covers are designed to fit in a particular location (e.g., left side, rear actuator; or left side, front actuator, etc.). In some implementations, a lip 415 can be added be added to a cover (e.g., cover 410) to help a user remove it. Lip 415 can be included on any suitable location of cover 410.

Figure 5B:
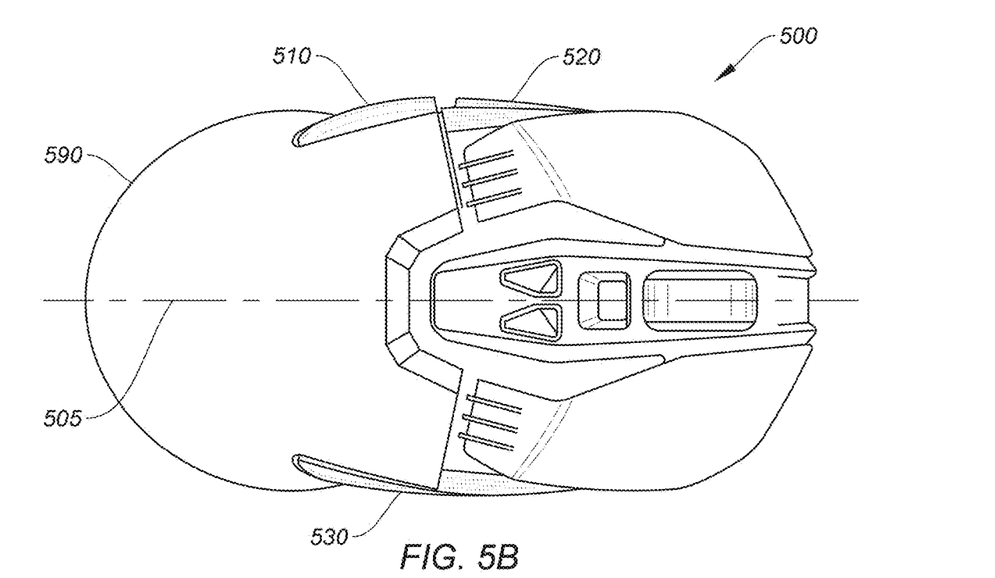
FIG. 5B shows a simplified diagram of an input device, according to certain embodiments.

FIGS. 5A and 5B show an input device 500 with a symmetrical housing and/or housing, according to certain embodiments. Input device 500 includes housing 590, button covers 510, 520, blank cover 530, various buttons 560, scroll wheel 570, left button 580, and right button 590. The chassis and/or housing 590 can be symmetrical along symmetry line 505. FIG. 5A shows a left-handed configuration of input device 500 because button covers 510, 520 are configured on the right side of chassis 590 (accessible by a left-hand thumb) and blank cover 530 is configured on the left side of chassis 590 (configured for no actuator activation). In contrast, FIG. 5B shows a right-handed configuration of input device 500 because button covers 510, 520 are configured on the left side of chassis 590 (accessible by a right-hand thumb) and blank cover 530 is configured on the right side of chassis 590 (configured for no actuator activation). In some embodiments, the actuators (not shown) may be not disposed symmetrically along the chassis for any axis (e.g., positioning front-to-back, top-to-bottom, etc.).

In some embodiments, processor(s) 210 can automatically detect which configuration (e.g., left-hand or right-hand configuration) input device 500 is in based on a the type of covers coupled to one or more of the actuators. For instance, if one or more button covers are coupled to actuators on the left-hand side of chassis 590 (e.g., accessible by a user's thumb) and/or one or more blank covers are coupled to actuators on the right-hand side of chassis 590, processor(s) 210 may determine that input device 500 is configured in a right-handed configuration. Similarly, if one or more button covers are coupled to actuators on the right-hand side of chassis 590 and/or one or more blank covers are coupled to actuators on the left-hand side of chassis 590, processor(s) 210 may determine that input device 500 is configured in a left-handed configuration. Processor(s) 210 (or cover detection block 260) can detect when a cover is on an actuator in many different ways, as discussed above.

In certain embodiments, processor(s) 210 can automatically detect which configuration input device 500 is in based on a the type of covers coupled to one or more of the actuators, even when both blank covers and button covers are coupled to actuators on the same side. For example, processor(s) 210 may determine that input device 500 is in a right-handed configuration if both a blank cover and a button cover is coupled to actuators on the left-side of chassis 590 and only a blank cover(s) are coupled to actuators on the right-side of chassis 590 because at least one thumb-accessible button cover is used on the left side. Some embodiments may make similar left/right handed determinations for actuators on any location on input device 500, as would be understood by one of ordinary skill in the art.

In certain embodiments, processor(s) 210 can configure additional functions of input device 500 based on the use of button and blank covers. In some cases, other various buttons can be configured based on the left or right handedness of input device 500. For instance, when input device 500 is determined to be in the right-handed configuration (e.g., due to button covers on the left-hand side of chassis 590), left button 580 can be configured to be a primary mouse click (e.g., left mouse click) and right button 590 can be configured to be a secondary mouse click (e.g., right mouse click). Conversely, when input device 500 is determined to be in the left-handed configuration (e.g., due to button covers on the right-hand side of chassis 590), left button 580 can be configured to be a secondary mouse click and right button 590 can be configured to be a primary mouse click.

In some embodiments, input device 500 can be optimized for specific types of applications based on the use of button and/or blank covers. For example, certain button covers may cause processor(s) 210 to be configured for certain fast-action video games (e.g., first person shooters (FPS), platformers, etc.) by changing a dots-per-inch (DPI) setting of input device 500, assigning certain "hot keys" to specific actuators, and the like, as would be appreciated by one of ordinary skill in the art. In another example, certain button or blank covers may cause input device 500 to be optimized for certain work documents (e.g., word processing, spreadsheets, etc.) by assigning certain scroll setting to scroll wheel 570, assigning editing functions to various buttons 560, or the like, as would be appreciated by one of ordinary skill in the art. Any type of application and assignment of commonly used functions to input device 500 are contemplated.

Figure 6:
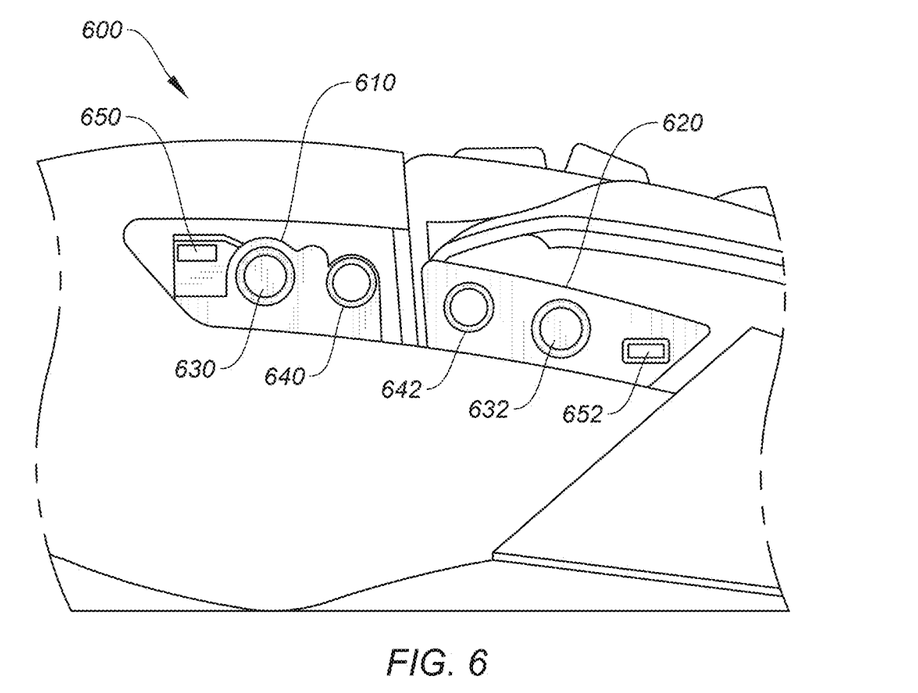
FIG. 6 shows a simplified, close-up diagram of an input device, according to certain embodiments.

FIG. 6 shows a close-up view of two actuators 610, 620 on input device 600, according to certain embodiments. Actuators can include a number of features to couple to and retain covers (e.g., magnets, pins, mechanical locking mechanisms, etc.), detect a type of cover (e.g., pins, electrical contacts, etc.), or operate to align a cover to an actuator for a proper fit. Input device 600 can include first actuator 610 and second actuator 620. First actuator 610 can include magnet 630, alignment point 640, and key 650.

Magnet 630 can be used to couple a button cover or blank cover (e.g., having a metallic slug, magnet, or other magnetically attractive element embedded therein) to first actuator 610. Magnet 630 can also be used to prevent certain covers from being coupled to actuator 610. For instance, some covers may include a polarized magnet having a similar polarity as magnet 630, causing them to be repelled from actuator 610. The magnetically attractive element in the cover (not shown) can be in the form of a rod, slug, pin, or other shape in any suitable location and/or orientation.

Alignment point 640 can be used to prevent a cover from rotating on a corresponding actuator. In some embodiments, a cover may include a protrusion (e.g., pin) that fits into alignment point 640. In some embodiments, alignment point 640 may include electrical properties. For instance, alignment point 640 may include one or more electrical contacts to send data (e.g., a voltage level) from the cover, through the actuator, and on to processor(s) 210 to indicate the type of cover being used. In some cases, alignment point 640 may function as a grounding pin. In some implementations, actuators may not include an alignment point, or may include additional alignment points, as would be appreciated by one of ordinary skill in the art. That is, alignment points can be useful in a variety of ways, but are not required for coupling a cover to an actuator, according to certain embodiments. In some cases, alignment point 640 can include a magnet disposed therein and may perform the function of magnet 630.

Key 650 can be used to ensure that a cover is correctly attached and aligned with actuator 610, according to certain embodiments. For example, key 650 can be a small recess that receives an element from a cover (e.g., pin, rod, protrusion, etc.) when the cover is coupled to actuator 610. Key 650 can be positioned such that a cover cannot be attached upside down or be placed in any incorrect alignment. Key 650 may also include certain electrical properties, as described above with respect to alignment point 640. In some embodiments, key 650 and alignment point 640 may perform some or all of the same functions such that only one (e.g., key 650) or the other (alignment point 640) may be needed on one actuator. Key 650 is shown having a narrow, rectangular shape, however any suitable shape, size, placement, or number of keys 650 can be used, as would be understood by one of ordinary skill in the art. In some implementations, key 650 can include a magnet disposed therein and may perform the function of magnet 630. It should be recognized that key 650 is not a required element of first actuator 610 because a cover can be attached to first actuator 610 with one or more of the other elements described herein. One of ordinary skill in the art would recognize that many combinations, configurations, and placements of magnet 630, alignment point 640, and key 650, which do not need to be configured or aligned (e.g., vertically, horizontally, etc.) in any particular order.

Input device 600 further includes second actuator 620, which may also include a corresponding magnet 632, alignment point 642, and/or key 652. The implementation of these features can be similar or different from their implementation on first actuator 610. While FIG. 6 depicts two actuators on a right side of input device 600, it should be understood that any number of actuators can be included on any suitable location (e.g., left side, right side, top side, etc.).

Figure 7:
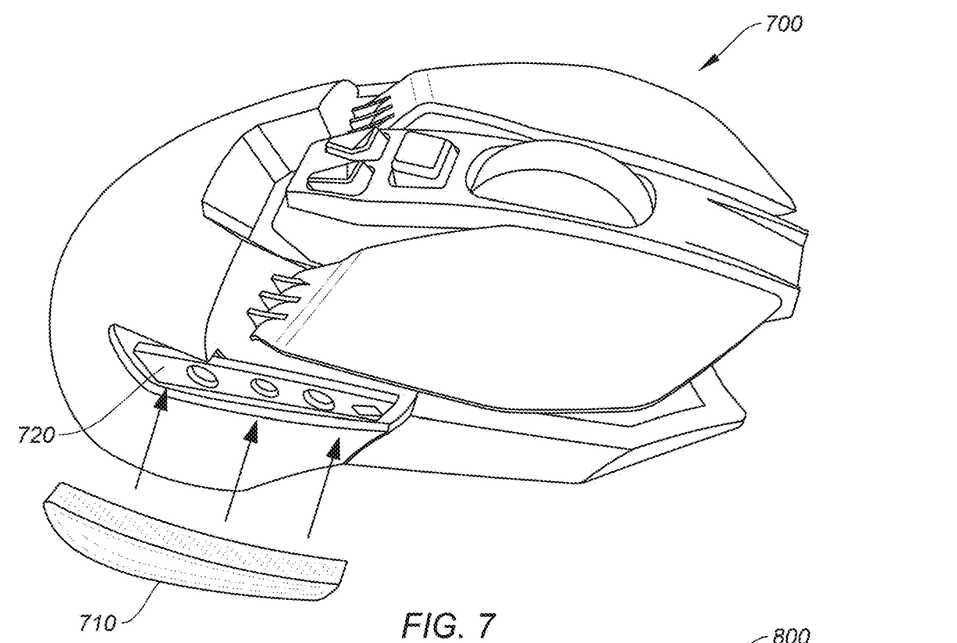
FIG. 7 shows a simplified diagram of an input device, according to certain embodiments.

FIG. 7 shows single actuator 720 disposed on a chassis of input device 700, according to certain embodiments. Button cover 710 can be configured to couple to actuator 720, as described above with respect to FIGS. 3-6. Input device 700 may be shown in a left-handed configuration (e.g., button cover 710 and actuator 720 are accessible by a user's left-hand thumb) or in a right-handed configuration (e.g., button cover 710 and actuator 720 are accessible by a user's right-hand ring and/or pinky finger). Actuator 720 may share similar features (e.g., magnets, keys, alignment points, etc.) with actuator 610, and may include those features in any number, configuration, placement, or the like. FIG. 7 shows actuator 720 with a corresponding single button cover 710. Some embodiments may utilize multiple covers (e.g., uniform size covers) to couple to actuator 720, as would be understood by one of ordinary skill in the art.

Figure 8:
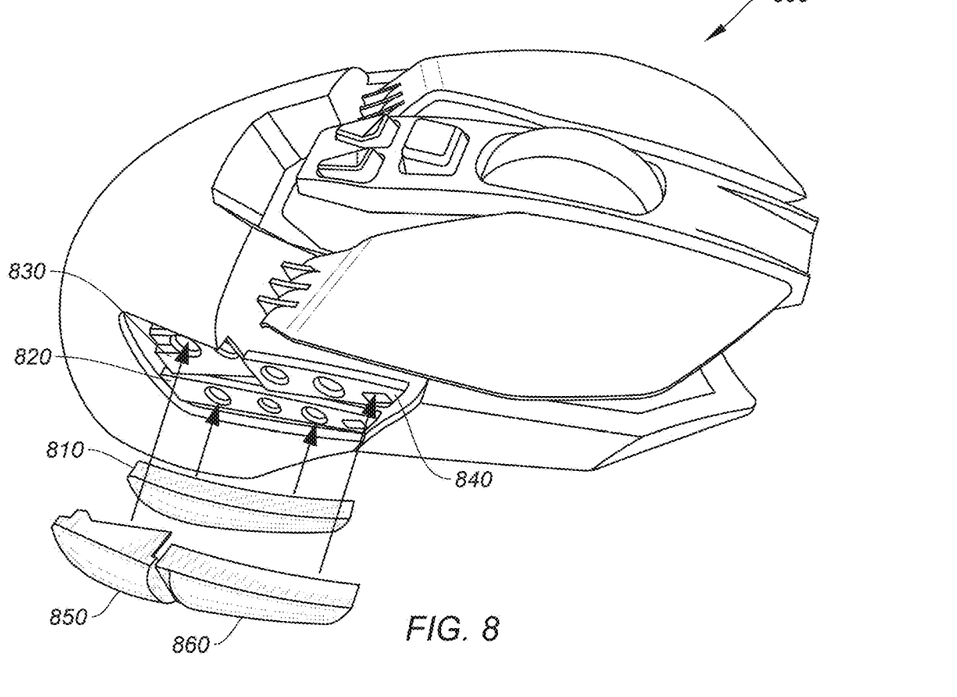
FIG. 8 shows a simplified diagram of an input device, according to certain embodiments.

FIG. 8 shows multiple actuators disposed on a chassis of input device 800, according to certain embodiments. Input device 800 includes actuators 820-840. Button cover 810 is configured to couple to actuator 820, button cover 850 is configured to couple to 830, and button cover 860 is configured to cover actuator 840. Any configuration of actuators and corresponding button covers or blank covers are possible. For example, any number of rows of actuators may be disposed on the chassis. Two rows of actuators are shown in FIG. 8, however more rows or fewer rows are possible. Any number of actuators per row are possible. In FIG. 8, the top row has two actuators 830, 840, and the bottom row has a single larger actuator 820. Actuators and their corresponding button and/or blank covers can come in any suitable shape or size and may or may not include some or all of the coupling features discussed above (e.g., magnets, alignment points, keys, etc.). Furthermore, covers can be mixed and matched in any suitable arrangement. For instance, blank covers can be coupled to actuators 830 and 840, and a button cover can be coupled to actuator 820. One of ordinary skill in the art would recognize the many variations, modifications, and combinations of coupling button and/or blank covers to actuators.

Figure 9:
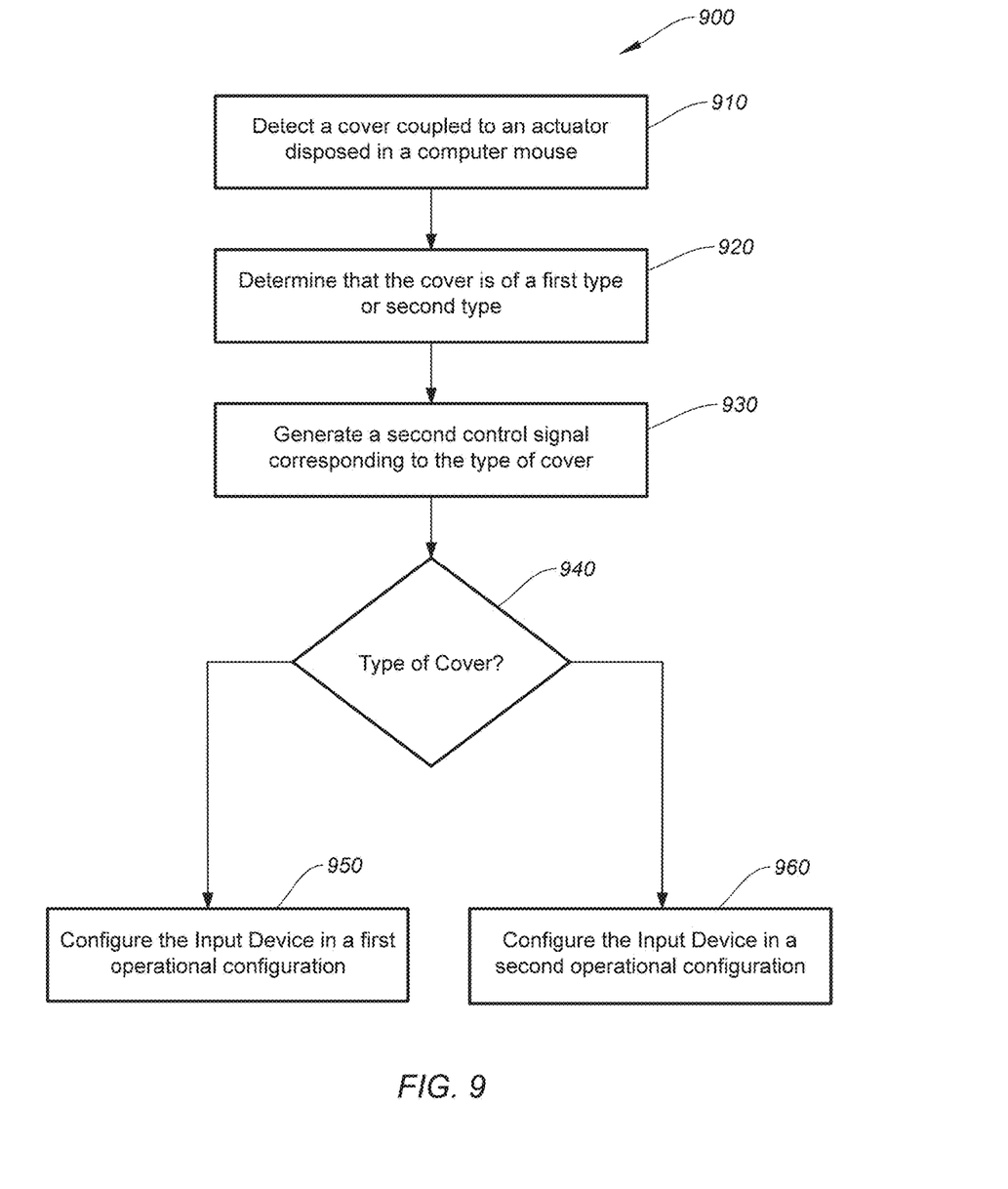
FIG. 9 shows a simplified flow diagram illustrating a process for configuring an input device, according to certain embodiments.

FIG. 9 shows a simplified method 900 for automatically configuring an operation of an input device, according to certain embodiments. Method 900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 900 can be performed by system 200 of FIG. 2, and specifically executed by processor(s) 210.

At step 910, method 900 includes detecting a cover coupled to an actuator disposed in the input device, where the actuator, when depressed, generates a first control signal to control a remote computing device. A cover can be a button cover or blank cover. The actuator can be coupled to the chassis. A remote computer can be any suitable computing device (e.g., computer 100) including, but not limited to, a desktop computer, laptop computer, netbook, tablet computer, mobile computing device, or the like. The control signal can be a simple signal, such as an analog or digital signal indicating a button press, or a more complex signal providing single or multiple human interface device (HID) commands. Any suitable signal type or function can be generated in response to a button press, as would be understood by one of ordinary skill in the art. In some cases, a signal may be generated during periods where there is no button press (e.g., indicating inactivity, a blank cover in use, etc.).

At step 920, method 900 includes determining that the cover is of a first type or a second type. As mentioned above, a first type of cover can be a button cover. A second type of cover can be a blank cover. Button covers and blank covers can be of any suitable size or shape and may be coupled to an actuator by any suitable means (e.g., magnets, pins, alignment pins, etc.). Button/blank covers may be removable and can be separate from the housing or chassis.

At step 930, method 900 includes generating a second control signal corresponding to the cover being of the first type or second type. The second control signal can be any suitable signal that causes the input device or a host computing device to perform a certain function. For example, the second control signal may cause the input device to switch to a left-handed configuration or a right-handed configuration based on the types of covers being used. In another example, certain covers may cause the input device to optimize controls for a particular type of application. For instance, certain covers may cause an input device to be optimized for FPS games with increased DPI settings, specific button layout assignments, and the like. In some implementations, certain covers may cause an input device to be optimized for word processing or spreadsheet applications with preset scroll-wheel settings, editing features mapped to input device buttons (e.g., cut/paste, back, save, etc.). Those of ordinary skill in the art would understand the many variations, modifications, and alternatives thereof.

Method 900 further includes configuring the computer mouse in a first operational configuration (step 950) in response to determining that the cover is of the first type (step 940), and configuring the computer mouse in a second operational configuration (step 960) in response to determining that the cover is of the second type (step 940). In some embodiments, the first operational configuration includes configuring the mouse in a right-handed configuration, and the second operational configuration includes configuring the mouse in a left-handed configuration. For example, an input device can include a first mouse button (left main button) and a second mouse button (right main button). In a right-handed configuration, the first mouse button, when pressed, may generate a third control signal that corresponds to a left-button mouse click, and the second mouse button, when pressed, may generate a fourth control signal corresponding to a right-button mouse click. Similarly, when the input device is in the left-handed configuration, the first mouse button, when pressed, may generate the third control signal that corresponds to a right-button mouse click, and the second mouse button, when pressed, may generate the fourth control signal that corresponds to a left-button mouse click. The first and second operating configurations can also be referred to as operating states.

It should be appreciated that the specific steps illustrated in FIG. 9 provide a particular method 900 for automatically configuring an operation of an input device, according to certain embodiments. Other sequences of steps may also be performed according to alternative embodiments. For example, alternative embodiments may perform the steps outlined above in a different order. For instance, any of the functions, features, and operational configurations described above with respect to FIGS. 1-8 and 10-11B can be included in method 900. In some cases, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 900.

Figure 11A:
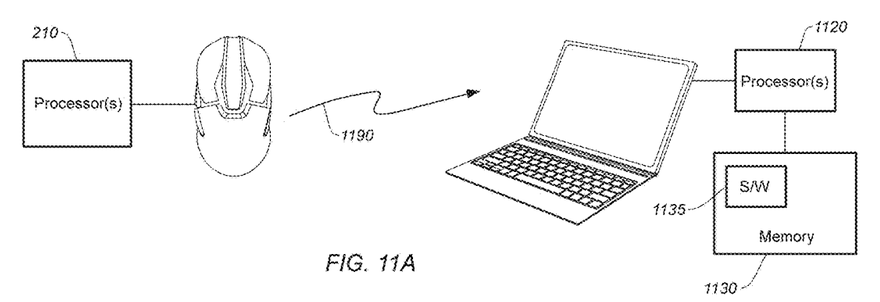
FIG. 11A shows a simplified block diagram of a system for automatically configuring an input device by one or more processors local to the input device, according to certain embodiments.

FIG. 11A shows a simplified block diagram of a system 1100 for automatically configuring an input device by one or more processors local to the input device, according to certain embodiments. System 1100 includes input device 1140 and host computing device (e.g., host computer) 1110. Input device 1140 includes system 200, including processor(s) 210. Host computing device 1110 includes one or more processors 1120 and corresponding software 1135 stored on memory 1130. Software 1135 is executed by the one or more processors 1120 and controls and configures operational aspects of input device 1140 (e.g., interpreting control signals, assigning/interpreting HID commands, executing operations (button press commands, movement commands, and the like, as would be understood by one of ordinary skill in the art). In some cases, firmware (not shown) may be used in lieu of, or in combination with software 1135 to implement the embodiments described herein (e.g., method 900).

In certain embodiments, aspects of method 900 (e.g., method steps 950, 960) can be performed by processor(s) 210, processor(s) 1120), or a combination thereof. For example, input device 1140 of FIG. 11A may generate a first control signal (e.g., when an actuator is pressed) and second control signal indicating the type of cover coupled to the actuator. In some implementations, processor(s) 210 of input device 1140 may then utilize the first and second control signals to configure input device 1140 in a first or second operational configuration (or any number of configurations). In this example, input device 1140 provides host computer 1110 with corresponding HID commands including information 1190 related to the configuration (e.g., button settings, performance parameters, etc.) of input device 1140, which corresponding processor(s) 1120 and software 1130 of host computer 1110 carry out. In other words, input device 1140 performs all (or most) of the processing and sends the instructions (e.g., operating input device 1140 in a left-handed configuration) to host computer 1110 to implement.

Figure 11B:
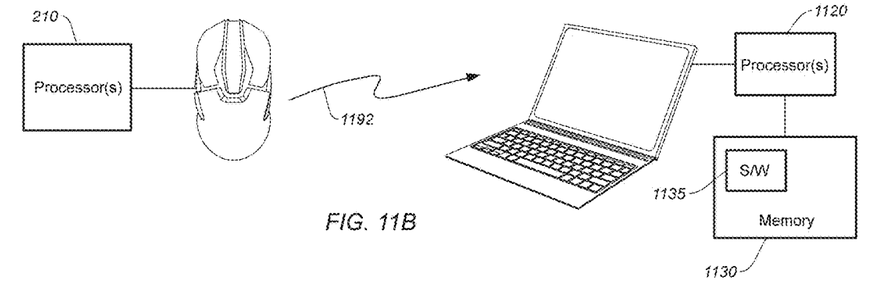
FIG. 11B shows a simplified block diagram of a system for automatically configuring an input device by one or more processors local to a corresponding host computer, according to certain embodiments.

FIG. 11B shows a simplified block diagram of a system 1100 for automatically configuring an input device by one or more processors local to a corresponding host computing device, according to certain embodiments. To simplify the explanation of operations, the system components of FIG. 11B (e.g., input device 1140, host computer 1110, etc.) are the same as the system components of FIG. 11A.

In certain embodiments, input device 1140 of FIG. 11B may generate a first control signal (e.g., when an actuator is pressed) and second control signal indicating the type of cover coupled to the actuator. In some implementations, processor(s) 1120 of host computer 1110 may then utilize the first and second control signals to configure input device 1140 in a first or second operational configuration (or any number of configurations). In this example, input device 1140 provides host computer 1110 with basic information 1192 (e.g., control signal(s) indicating button presses or control signals generated when a cover is coupled to an actuator, etc.), which corresponding processor(s) 1120 and software 1130 of host computer 1110 interpret and carry out. In other words, input device 1140 only provides the basic control signals to host computer 1110, and host computer 1110 interprets and configures the operation of input device 1140 accordingly. In certain embodiments, both processor(s) 210 and processor(s) 1120 may perform certain aspects of configuring input device 1140, as would be understood by one of ordinary skill in the art with the benefit of this disclosure.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and operations, it should be apparent to those skilled in the art that the scope of the present disclosure is not strictly limited to the described flows and operations. Operations described as sequential may be executed in parallel, order of operations may be varied, and operations may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of this disclosure as set forth in the following claims.

What is claimed is:

1. A method of operating a computer mouse, the method comprising:
    detecting, by a processor, a presence of a button cover directly attached to an actuator disposed in the computer mouse, wherein the actuator, in response to being depressed, generates a first control signal to control a remote computing device;
    determining, by the processor, that the button cover is of a first type or a second type; and
    generating, by the processor, a second control signal based on whether the button cover is of the first type or second type.

2. The method of claim 1 further comprising:
    configuring, by the processor, the computer mouse in a first operational configuration in response to determining that the button cover is of the first type; and
    configuring, by the processor, the computer mouse in a second operational configuration in response to determining that the button cover is of the second type.

3. The method of claim 2 wherein the first operational configuration includes configuring the computer mouse in a right-handed configuration, and
    wherein the second operational configuration includes configuring the computer mouse in a left-handed configuration.

4. The method of claim 3 wherein the mouse includes:
    a first mouse button; and
    a second mouse button,
    wherein when in the right-handed configuration:
        the first mouse button, in response to being pressed, generates a third control signal that corresponds to a left-button mouse click; and
        the second mouse button, in response to being pressed, generates a fourth control signal corresponding to a right-button mouse click; and
    wherein when in the left-handed configuration:
        the first mouse button, in response to being pressed, generates the third control signal that corresponds to a right-button mouse click; and
        the second mouse button, in response to being pressed, generates the fourth control signal that corresponds to a left-button mouse click.

5. A method of operating a computer mouse, the method comprising:
    receiving, by a host computer coupled to the computer mouse, a first control signal indicating that a button cover is directly coupled to an actuator disposed in the computer mouse;
    determining, by the host computer, whether the button cover is of a first type or a second type;
    generating, by the host computer, a second control signal to cause the computer mouse to operate in a first operational configuration in response to determining that the cover is of the first type; and
    generating, by the host computer, a third control signal to cause the computer mouse to operate in a second operational configuration in response to determining that the cover is of the second type.

* * * * *